(12) United States Patent
Kim et al.

(10) Patent No.: US 10,454,523 B1
(45) Date of Patent: Oct. 22, 2019

(54) RADIO FREQUENCY SIGNAL GENERATION DEVICE, AND TRANSMITTER AND RECEIVER INCLUDING THE SAME

(71) Applicant: ELECTRONICS AND TELECOMMUNICATIONS RESEARCH INSTITUTE, Daejeon (KR)

(72) Inventors: Sungil Kim, Daejeon (KR); Jung Min Park, Daejeon (KR); Minje Song, Daejeon (KR); Minhyup Song, Daejeon (KR); Jae-Sik Sim, Sejong (KR); Joon Tae Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/162,098

(22) Filed: Oct. 16, 2018

(30) Foreign Application Priority Data

Jun. 4, 2018 (KR) ........................ 10-2018-0064511

(51) Int. Cl.
*H04B 1/7156* (2011.01)
*H04B 1/7136* (2011.01)
(Continued)

(52) U.S. Cl.
CPC ....... *H04B 1/7156* (2013.01); *G02B 6/12007* (2013.01); *H04B 1/7136* (2013.01);
(Continued)

(58) Field of Classification Search
CPC .. H04B 1/7156; H04B 1/7136; H04B 7/0413; H04B 2001/71362; H04B 2001/71566;
(Continued)

(56) References Cited

U.S. PATENT DOCUMENTS 9,705,599 B2   7/2017  Dangui et al.
9,735,925 B2   8/2017  Ann et al.
(Continued)

FOREIGN PATENT DOCUMENTS

KR    10-2016-0106522 A    9/2016

OTHER PUBLICATIONS

S. Koenig et al., "100 Gbit/s Wireless Link with mm-Wave Photonics", OFC/NFOEC Postdeadline Papers, 2013, p. 1-3, Optical Society of America.

*Primary Examiner* — Wednel Cadeau

(57) ABSTRACT

A radio frequency signal generation device may include an optical comb generator configured to generate an optical comb signal including a plurality of first wavelength signals having different wavelengths; a pulse shaper configured to attenuate remaining wavelength signals excluding a plurality of second wavelength signals among the plurality of first wavelength signals; an optical-electronic converter configured to generate a radio frequency signal including a carrier frequency signal from the plurality of second wavelength signals outputted from the pulse shaper; and a pulse shaping controller configured to control the pulse shaper such that a carrier frequency of the carrier frequency signal varies according to a frequency hopping pattern.

14 Claims, 4 Drawing Sheets

(51) Int. Cl.
*H04B 7/0413* (2017.01)
*G02B 6/12* (2006.01)

(52) U.S. Cl.
CPC ....... *H04B 7/0413* (2013.01); *G02F 2203/56* (2013.01); *H04B 2001/71362* (2013.01); *H04B 2001/71566* (2013.01); *H04B 2210/006* (2013.01)

(58) Field of Classification Search
CPC .......... H04B 2210/006; G02B 6/12007; G02F 2203/56
USPC ........................................................ 375/134
See application file for complete search history.

(56) References Cited

U.S. PATENT DOCUMENTS

| | | | | |
|---|---|---|---|---|
| 2002/0114034 A1* | 8/2002 | Way | ..................... | H04B 10/503 398/79 |
| 2003/0219257 A1* | 11/2003 | Williams | .............. | H01S 3/0675 398/152 |
| 2010/0092183 A1* | 4/2010 | Kim | ................... | H04B 10/2575 398/183 |
| 2015/0002918 A1 | 1/2015 | Kwon et al. | | |
| 2016/0077404 A1 | 3/2016 | Kwon et al. | | |

\* cited by examiner

RADIO FREQUENCY SIGNAL GENERATION DEVICE, AND TRANSMITTER AND RECEIVER INCLUDING THE SAME

CROSS-REFERENCE TO RELATED APPLICATION

This application claims priority to and the benefit of Korean Patent Application No. 10-2018-0064511 filed in the Korean Intellectual Property Office on Jun. 4, 2018, the entire contents of which are incorporated herein by reference.

BACKGROUND

(a) Field

The present invention relates to a radio frequency signal generation device and a transmitter and a receiver including the same, and more particularly, to an optical-based radio frequency signal generation device and a transmitter and a receiver including the same.

(b) Description of the Related Art

In order to increase the transmission/reception speed of a communication system, it is necessary to secure a wide frequency band. However, since the use of a frequency band below a millimeter wave band has already been determined, it is impossible to secure a wide frequency band for high-speed communication. Also, in the millimeter wave band or the terahertz wave band where it is possible to secure a broadband, component technologies such as an oscillator or a modulator based on a stable electronic device have not yet matured.

Optical devices and modularization technologies have developed into core technologies of a wired communication network configuration including Fiber-To-The-Home (FTTH), and have very highly technical maturing. Recently, research into radio-over-fiber (RoF) technology for generating and processing millimeter wave and terahertz wave signals utilizing such optical devices has been actively conducted. RoF collectively refers to a technical field of generating and transmitting and receiving an RF (Radio Frequency) signal in a very high frequency band, a millimeter wave band, or a terahertz wave band by using an optical signal, or transmitting and receiving an optical signal modulated by RF through an optical fiber.

In order to generate an RF signal using an optical signal, a method of beating two optical signals having different wavelengths is widely used. The frequency of the RF signal generated by beating the optical signals having different wavelengths is the same as a difference between two different wavelengths. At this time, the greater the interval between the two wavelengths, the higher the RF signal may be generated, and when the interference between the two different wavelengths is minimized, the RF signal having low noise characteristics may be generated.

Generally, such an optical-based RF signal generation technique generates a single-frequency RF signal and constitutes a system for performing communication or sensing using the RF signal. Therefore, in order to change the frequency of the RF signal generated by using the optical signal, hardware component replacement is required.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide an optical-based radio frequency signal generation device having advantages of varying a frequency, and a transmitter and a receiver including the same.

An exemplary embodiment of the present invention provides a transmitter including an optical comb generator configured to generate an optical comb signal including a plurality of first wavelength signals having different wavelengths; a pulse shaper configured to attenuate remaining wavelength signals excluding a plurality of second wavelength signals among the plurality of first wavelength signals; an optical-electronic converter configured to generate a carrier frequency signal from the plurality of second wavelength signals outputted from the pulse shaper; a transmitter configured to transmit a signal to a receiver using the carrier frequency signal; a memory storing a plurality of security codes and a carrier frequency corresponding to each of the plurality of security codes; and a controller configured to sequentially select at least one of the plurality of security codes according to a frequency hopping pattern and control the pulse shaper according to a carrier frequency corresponding to the selected at least one security code.

The controller may be configured to control the plurality of second wavelength signals such that a carrier frequency of the carrier frequency signal varies in correspondence to the carrier frequency corresponding to the selected at least one security code.

The transmitter may further include a transceiver configured to transmit the selected at least one security code to the receiver.

A frequency signal used to transmit the at least one security code in the transceiver may be a signal of a low frequency band relative to the at least one carrier frequency signal.

The plurality of security codes and the carrier frequency corresponding to each of the plurality of security codes may be shared with the receiver.

The optical-electronic converter may be configured to generate the carrier frequency signal by beating the plurality of second wavelength signals with each other.

The carrier frequency of the carrier frequency signal may be determined by a frequency difference between the plurality of second wavelength signals, and the controller may be configured to control the number of the plurality of second wavelength signals output from the pulse shaper so that a signal output from the optical-electronic converter includes a multi-carrier frequency signal.

Another embodiment of the present invention provides a receiver including an optical comb generator configured to generate an optical comb signal including a plurality of first wavelength signals having different wavelengths; a pulse shaper configured to attenuate remaining wavelength signals excluding a plurality of second wavelength signals among the plurality of first wavelength signals; an optical-electronic converter configured to generate a carrier frequency signal from the plurality of second wavelength signals outputted from the pulse shaper; a receiver configured to receive a signal from a transmitter using the carrier frequency signal; a memory storing a plurality of security codes and a carrier frequency corresponding to each of the plurality of security codes; a transceiver configured to receive from the transmitter at least one security code that varies according to a frequency hopping pattern; and a controller configured to obtain a carrier frequency corresponding to the received at least one security code from the memory and control the pulse shaper according to the carrier frequency corresponding to the at least one security code.

A frequency signal used to receive the at least one security code in the transceiver may be a signal of a low frequency band relative to the at least one carrier frequency signal.

The plurality of security codes and the carrier frequency corresponding to each of the plurality of security codes may be shared with the transmitter.

The optical-electronic converter may be configured to generate the carrier frequency signal by beating the plurality of second wavelength signals with each other.

The frequency of the carrier frequency signal may be determined by a frequency difference between the plurality of second wavelength signals, and the controller may be configured to control the number of the plurality of second wavelength signals output from the pulse shaper so that a signal output from the optical-electronic converter includes a multi-carrier frequency signal.

Yet another embodiment of the present invention provides a radio frequency signal generation device including an optical comb generator configured to generate an optical comb signal including a plurality of first wavelength signals having different wavelengths; a pulse shaper configured to attenuate remaining wavelength signals excluding a plurality of second wavelength signals among the plurality of first wavelength signals; an optical-electronic converter configured to generate a radio frequency signal including a carrier frequency signal from the plurality of second wavelength signals outputted from the pulse shaper; and a pulse shaping controller configured to control the pulse shaper such that a frequency of the carrier frequency signal varies according to a frequency hopping pattern.

The pulse shaping controller may be configured to control the number of the plurality of second wavelength signals so that the radio frequency signal output from the optical-electronic converter includes a multi-carrier frequency signal.

According to an exemplary embodiment of the present invention, it is possible to provide an optical-based radio frequency signal generation device capable of generating a multicarrier signal. Also, it is possible to secure a broadband in a communication system by utilizing this.

Further, according to an exemplary embodiment of the present invention, it is possible to provide an optical-based radio frequency signal generation device capable of varying a frequency. Also, the security of the communication system may be enhanced by utilizing this.

DETAILED DESCRIPTION OF THE EMBODIMENTS

Figure 1:
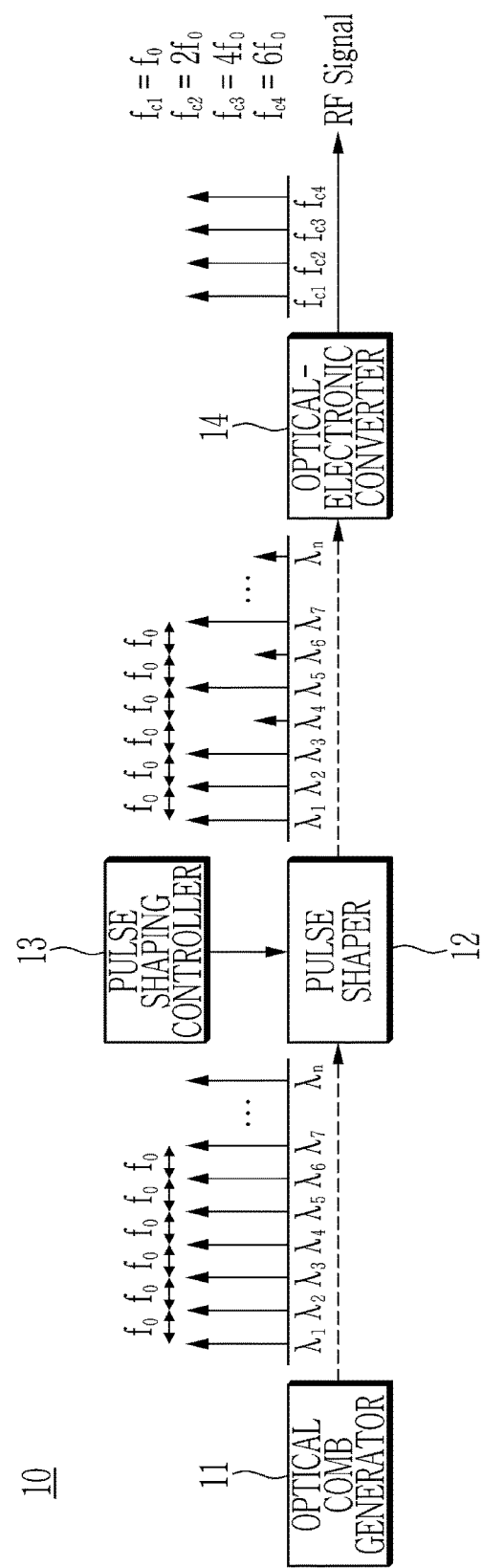
FIG. 1 is a diagram for explaining an optical coupling method of the optical-based RF signal generation device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, unless explicitly described to the contrary, the word "comprise" and variations such as "comprises" or "comprising", will be understood to imply the inclusion of stated elements but not the exclusion of any other elements.

Hereinafter, an optical-based radio frequency (RF) signal generation device according to an exemplary embodiment of the present invention and a wireless communication system including the same will be described in detail with reference to the accompanying drawings.

Figure 2:
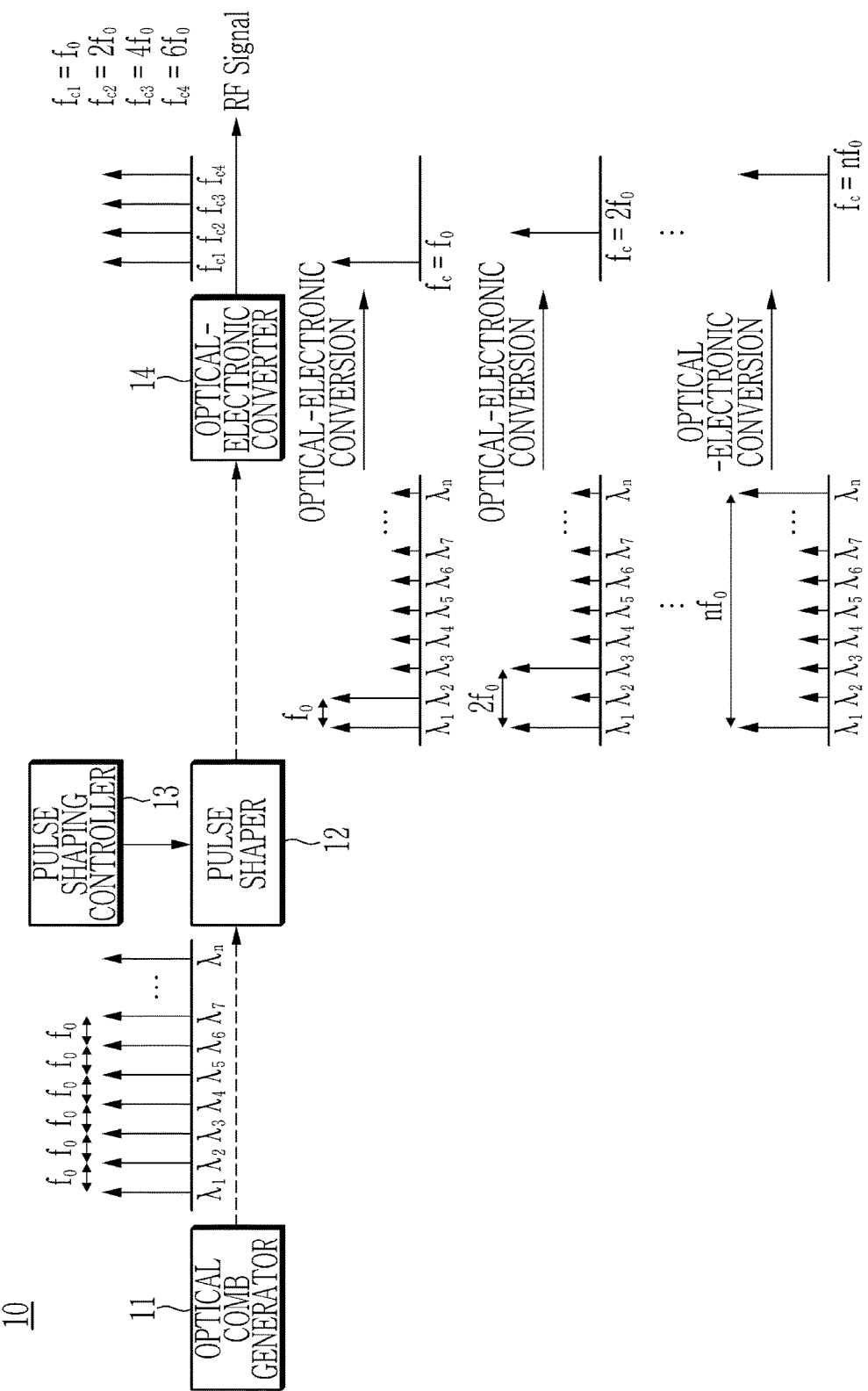
FIG. 2 is a diagram for explaining a frequency varying method of the optical-based RF signal generation device according to an exemplary embodiment of the present invention.

FIGS. 1 and 2 schematically show an optical-based RF signal generation device 10 according to an exemplary embodiment of the present invention. FIG. 1 is a diagram for explaining an optical coupling method of the optical-based RF signal generation device 10 according to an exemplary embodiment of the present invention. FIG. 2 is a diagram for explaining a frequency varying method of the optical-based RF signal generation device 10 according to an exemplary embodiment of the present invention.

Referring to FIGS. 1 and 2, the optical-based RF signal generator 10 according to an exemplary embodiment of the present invention may include an optical comb generator 11, a pulse shaper 12, a pulse shaping controller 13, and an optical-electronic converter 14.

The optical comb generator 11 may generate an optical comb signal having a plurality of wavelengths $\lambda_1$ (nm)-$\lambda_n$ (nm) by modulating light of a single wavelength generated by a light source (not shown).

The optical comb signal output from the optical comb generator 11 may include a plurality of optical signals (hereinafter referred to as "wavelength signals") having different wavelengths $\lambda_1$ (nm)-$\lambda_n$ (nm). Among the plurality of wavelength signals included in the optical comb signal, wavelength signals neighboring each other in a frequency domain have a frequency interval $f_0$ (GHz) determined by an oscillator (not shown) used for generating an optical comb.

The optical comb generator 11 may generate the optical comb signal using various methods such as mode locking, phase modulation, harmonic wave generation, etc.

The optical comb signal generated by the optical comb generator 11 may be input to the pulse shaper 12.

The pulse shaper 12 may selectively attenuate and then output wavelength signals included in the optical comb signal. That is, when the optical comb signal is input, the pulse shaper 12 may attenuate and output at least some of the plurality of wavelength signals constituting the optical comb signal.

The optical-electronic converter 14 may generate a radio frequency (RF) signal from the optical comb signal input after shaped by the pulse shaper 12. That is, when the wavelength signals of different wavelengths are input from the pulse shaper 12, the optical-electronic converter 14 may generate the RF signal by beating the wavelength signals through optical mixing.

The optical-electronic converter 14 may output an RF signal including a multi-carrier frequency signal according to a signal output from the pulse shaper 12. That is, when the pulse shaper 12 performs signal attenuation while leaving three or more wavelength signals, the optical-electronic converter 14 may generate the RF signal including a plurality of carrier frequency signals.

Referring to FIG. 1, for example, when the frequency interval $f_0$ between the wavelength signals (optical signals) included in the optical comb signal is 5 GHz and among the wavelength signals $\lambda_1$~$\lambda_n$ included in the optical comb signal, the wavelength signals that are not attenuated by the pulse shaper 12 are $\lambda_1$, $\lambda_2$, $\lambda_3$, $\lambda_5$, $\lambda_7$. In this case, the optical-electronic converter 14 may output a carrier frequency signal having a frequency of 5 GHz($f_0$) through beating of the two wavelength signals $\lambda_1$ and $\lambda_2$ and output a carrier frequency signal having a frequency of 10 GHz ($2f_0$) through beating of the two wavelength signals $\lambda_1$ and $\lambda_3$. Also, the optical-electronic converter 14 may output a carrier frequency signal having a frequency of 20 GHz($4f_0$) through beating of the two wavelength signals $\lambda_1$ and $\lambda_5$ and output a carrier frequency signal having a frequency of 30 GHz($6f_0$) through beating of the two wavelength signals $\lambda_1$ and $\lambda_7$. As described above, when four carrier frequency signals having different frequencies are generated from the optical-electronic converter 14 and each carrier frequency signal secures a frequency bandwidth of 60 MHz, the RF signal output from the optical-electronic converter 14 may secure a frequency bandwidth for data transmission of the total of 240 MHz.

The optical-electronic converter 14 may output an RF signal whose carrier frequency is seamlessly variable according to the signal output from the pulse shaper 12. The pulse shaper 12 may adjust the size of each wavelength signal (optical signal) constituting the optical comb signal according to a control signal applied from the pulse shaping controller 13. Therefore, when the control signal output from the pulse shaping controller 13 is continuously changed through programming, the wavelength signal attenuated by the pulse shaper 12 is continuously changed, and thus, like frequency hopping, the frequency of the RF signal output from the optical-electronic converter 14 may seamlessly vary.

Referring to FIG. 2, for example, while the pulse shaping controller 13 controls the pulse shaper 12 to attenuate and output the remaining wavelength signals except for the two wavelength signals having the frequency interval $f_0$ in the optical comb signal, the optical-electronic converter 14 may output a carrier frequency signal having the frequency $f_0$. Then, when the pulse shaping controller 13 controls the pulse shaper 12 to attenuate and output the remaining wavelength signals except for the two wavelength signals having the frequency interval $2f_0$ in the optical comb signal by controlling the control signal, the optical-electronic converter 14 may output a carrier frequency signal having the frequency $2f_0$. In this way, the pulse shaping controller 13 continuously adjusts the control signal applied to the pulse shaper 12 to change the wavelength signals attenuated in the optical comb signal, and thus the frequency of the carrier frequency signal output by the optical-electronic converter 14 may continuously vary.

In this frequency varying method, the frequency of the RF signal may vary by a software method, not a hardware method, and thus the high frequency variable speed may be expected.

Figure 3:
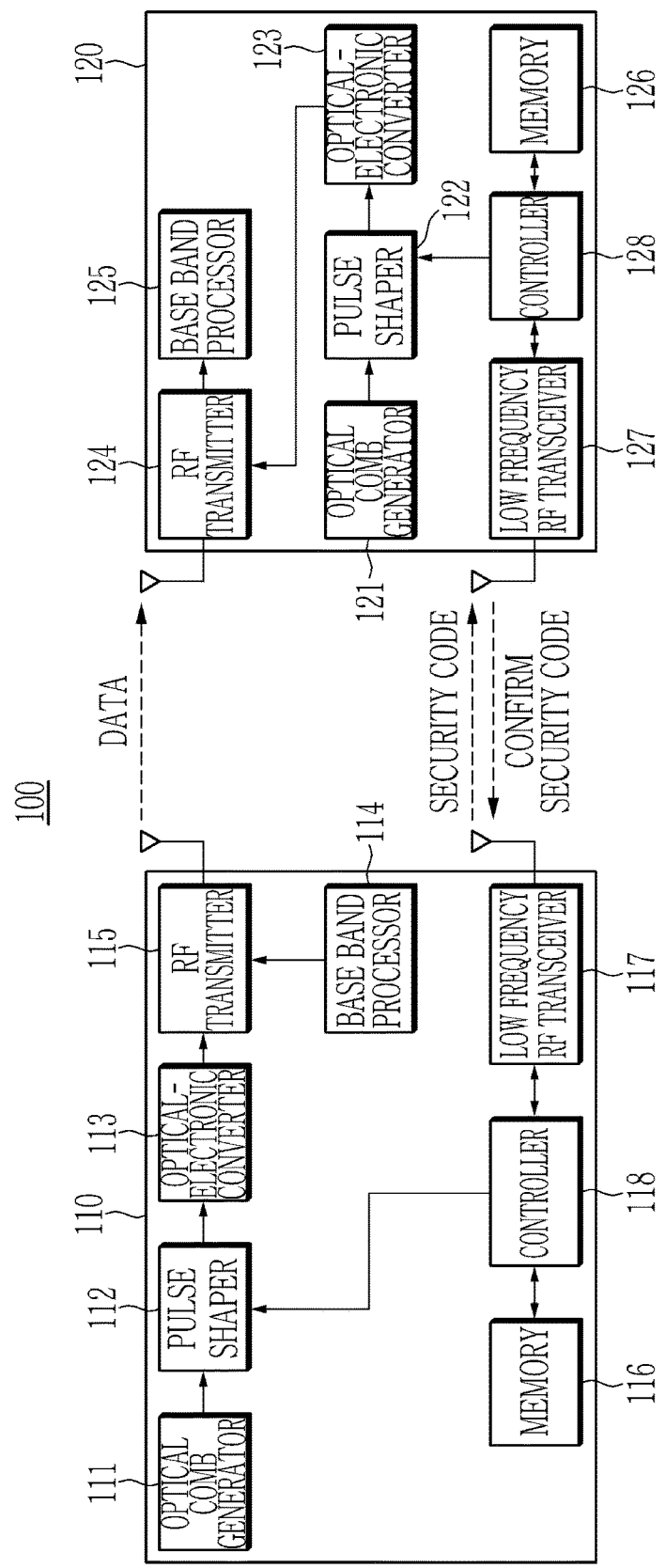
FIG. 3 illustrates an example of a communication system to which an optical-based RF signal generation device is applied according to an exemplary embodiment of the present invention.

FIG. 3 illustrates an example of a communication system 100 to which an optical-based RF signal generation device is applied according to an exemplary embodiment of the present invention.

Referring to FIG. 3, the communication system 100 according to an exemplary embodiment of the present invention may include a transmitter 110 and a receiver 120.

The transmitter 110 may include an optical comb generator 111, a pulse shaper 112, an optical-electronic converter 113, a base band processor 114, an RF transmitter 115, a memory 116, a low frequency RF transceiver 117, and a controller 118.

The optical comb generator 111, the pulse shaper 112, and the optical-electronic converter 113 constituting the transmitter 110 respectively correspond to the optical comb generator 11, the pulse shaper 12, and the optical-electronic converter 14 of the optical-based RF signal generation device 10 described with reference to FIG. 1. Also, a function of the pulse shaping controller 13 in the above-described optical-based RF signal generation device 10 of FIG. 1 may be included in the controller 118 of the transmitter 110.

The optical comb generator 111 may generate an optical comb signal including a plurality of wavelength signals having different wavelengths.

The pulse shaper 112 may attenuate and output remaining wavelength signals except for the plurality of wavelength signals selected by a control signal input from the controller 118 among the optical comb signal input from the optical comb generator 111.

The optical-electronic converter 113 may generate an RF signal including a carrier frequency signal by using the plurality of wavelength signals inputted from the pulse shaper 112.

In an exemplary embodiment of the present invention, the carrier frequency signal output by the optical-electronic converter 113 may be a frequency signal of a millimeter wave or terahertz wave band.

Also, the optical-electronic converter 113 may output an RF signal including a multi-carrier frequency signal according to a signal output from the pulse shaper 12.

When transmission data which is digital data is input, the baseband processor 114 may convert the transmission data into a transmission signal of a baseband which is an analog signal.

The RF transmitter 115 may convert the baseband transmission signal input from the baseband processor 114 into a transmission signal of an RF band using at least one carrier frequency signal output from the optical-electronic converter 113 and transmit the transmission signal through an antenna.

The memory 116 may map and store a plurality of security codes and a corresponding carrier frequency for each security code. The memory 116 may store the carrier frequency corresponding to each security code in the form of a look up table as shown in Table 1 below.

TABLE 1

Security Code Table

| Security code | Carrier frequency |
|---|---|
| 000000001 | $f_{c1}$ |
| 00001111 | $f_{c2}$ |
| 11100011 | $f_{c3}$ |

The low frequency RF transceiver 117 is a transceiver for transmitting and receiving data using a frequency signal in a lower frequency band than a carrier frequency used in the RF transmitter 115. When a security code is input by the controller 118, the low frequency RF transceiver 117 may transmit the security code using the RF signal of the low frequency band.

The controller 118 may control the overall operation of the transmitter 110.

When at least one carrier frequency to use for data transmission is selected, the controller 118 may read a security code corresponding to the at least one carrier frequency from the memory 116 and forward the security code to the low frequency RF transceiver 117. The controller 118 may also control the pulse shaper 112 to adjust the wavelength signals input to the optical-electronic converter 113 such that a carrier frequency signal corresponding to the selected carrier frequency may be output from the optical-electronic converter 113.

The transmitter 110 may transmit data using the RF signal including the multi-carrier frequency signal. To this end, the controller 118 may control the pulse shaper 112 to generate the RF signal including the multi-carrier frequency signal as shown in FIG. 1. The optical-electronic converter 113 may generate the RF signal including the multi-carrier frequency signal using a plurality of wavelength signals input from the pulse shaper 112. The RF transmitter 115 may convert the transmission signal of the baseband input from the baseband processor 114 into the transmission signal of the RF band using the multi-carrier frequency signal output from the optical-electronic converter 113.

The transmitter 110 may transmit data through frequency hopping that varies the carrier frequency signal. In this case, the controller 118 may control the pulse shaper 112 such that the frequency of the carrier frequency signal output from the optical-electronic converter 113 sequentially varies according to a frequency hopping pattern previously agreed with the receiver 120. Also, the low frequency RF transceiver 117 may be controlled to transmit a corresponding security code whenever the frequency of the carrier frequency signal used for data transmission is changed. Accordingly, the optical-electronic converter 113 may continuously output an RF signal to which frequency is hopped. The RF transmitter 115 may convert the transmission signal of the baseband input from the baseband processor 114 into the transmission signal of the RF band using the carrier frequency signal to which frequency is hopped.

Referring to FIG. 3 again, the receiver 120 may include an optical comb generator 121, a pulse shaper 122, an optical-electronic converter 123, an RF receiver 124, a baseband processor 125, a memory 126, a low frequency RF transceiver 127 and a controller 128.

The optical comb generator 121, the pulse shaper 122 and the optical-electronic converter 123 constituting the receiver 120 respectively correspond to the optical comb generator 11, the pulse shaper 12, and the optical-electronic converter 14 of the optical-based RF signal generation device 10 described with reference to FIG. 1. Also, a function of the pulse shaping controller 13 in the above-described optical-based RF signal generation device 10 of FIG. 1 may be included in the controller 128 of the receiver 120.

The optical comb generator 121 may generate an optical comb signal including a plurality of wavelength signals having different wavelengths.

The pulse shaper 122 may attenuate and output remaining wavelength signals except for the plurality of wavelength signals selected by a control signal input from the controller 128 among the optical comb signal input from the optical comb generator 121.

The optical-electronic converter 123 may generate an RF signal including at least one carrier frequency signal by using the plurality of wavelength signals inputted from the pulse shaper 122.

In an exemplary embodiment of the present invention, the carrier frequency signal output by the optical-electronic converter 123 may be a frequency signal of a millimeter wave or terahertz wave band.

Also, the optical-electronic converter 123 may output an RF signal including a multi-carrier frequency signal according to a signal output from the pulse shaper 12.

When a reception signal of the RF band is input through an antenna, the RF receiver 124 may convert the reception signal of the RF band into a reception signal of the baseband. That is, when the reception signal of the RF band is received through the antenna, the RF receiver 124 may convert the received reception signal of the RF band into the reception signal of the baseband using the at least one carrier frequency signal output from the optical-electronic converter 123 and amplify and output the reception signal of the baseband to the baseband processor 125. To this end, the RF receiver 124 may include a detector (not shown), an amplifier (not shown), etc.

When the reception signal of the baseband which is an analog signal is input from the RF receiver 124, the baseband processor 125 may convert the reception signal of the baseband into reception data which is a digital signal.

The memory 126 may map and store a plurality of security codes and a corresponding carrier frequency for each security code. The memory 126 may store the carrier frequency corresponding to each security code in the form of a look up table as shown in Table 1 below. Meanwhile, in an exemplary embodiment of the present invention, the transmitter 110 and the receiver 120 may share the security codes and the carrier frequency mapped to each security code.

The low frequency RF transceiver 127 is a transceiver for transmitting and receiving data using a frequency signal in a lower frequency band than a carrier frequency used in the RF receiver 124 and may receive the security code from the low frequency RF transceiver 117 of the transmitter 110. Also, after confirming the security code received from the controller 128, when response data for notifying confirmation of the security code is input, the response data may be transmitted to the low frequency RF transceiver 117 of the transmitter 110.

The controller 128 may control the overall operation of the receiver 120.

When the secure code is received from the transmitter 110 via the low frequency RF transceiver 127, the controller 128 may confirm the at least one carrier frequency corresponding to the security code received from the memory 126. The controller 128 may also control the pulse shaper 122 to adjust the wavelength signals input to the optical-electronic converter 123 such that a carrier frequency signal of a carrier frequency corresponding to the received security code may be output from the optical-electronic converter 123.

The receiver 120 may receive data using the RF signal including the multi-carrier frequency signal. In this case, the low frequency RF transceiver 127 may receive a plurality of security codes from the low frequency RF transceiver 117 of the transmitter 110, and the controller 128 may obtain a plurality of carrier frequencies corresponding to the received plurality of security codes from the memory 126. The controller 128 may also control the pulse shaper 122 to generate the RF signal including the multi-carrier frequency signal as shown in FIG. 1, in correspondence to the plurality of carrier frequencies obtained from the memory 126. Accordingly, the optical-electronic converter 123 may generate the RF signal including the multi-carrier frequency signal, and the RF receiver 124 may use the multi-carrier frequency signal output from the optical-electronic converter 123 to convert the reception signal of the RF band into the reception signal of the baseband.

The receiver 120 may receive data through frequency hopping. In this case, the low-frequency RF transceiver 127 may sequentially receive a plurality of security codes that vary according to the frequency hopping pattern from the low-frequency RF transceiver 117 of the transmitter 110.

Accordingly, the controller 128 may obtain a corresponding carrier frequency from the memory 128 whenever each security code is received and control the pulse shaper 112 such that the frequency of the carrier frequency signal output from the optical-electronic converter 113 sequentially varies using the carrier frequency.

As described above, the communication system according to an exemplary embodiment of the present invention may generate a multi-carrier frequency signal by using the optical-based radio frequency signal generation device (the optical comb generators 111 and 121, the pulse shapers 112 and 122, and the optical-electronic converters 113 and 123) and transmit and receive data by using the multi-carrier frequency signal. Accordingly, the communication system according to an exemplary embodiment of the present invention may secure a wide frequency band and support the Gbps level communication speed.

Also, the communication system according to an exemplary embodiment of the present invention may support data transmission/reception using frequency hopping through a seamless frequency variation of an RF signal generated by a frequency signal generation device. Therefore, the communication system according to an exemplary embodiment of the present invention may provide physical security communication, thereby providing high security performance.

Figure 4:
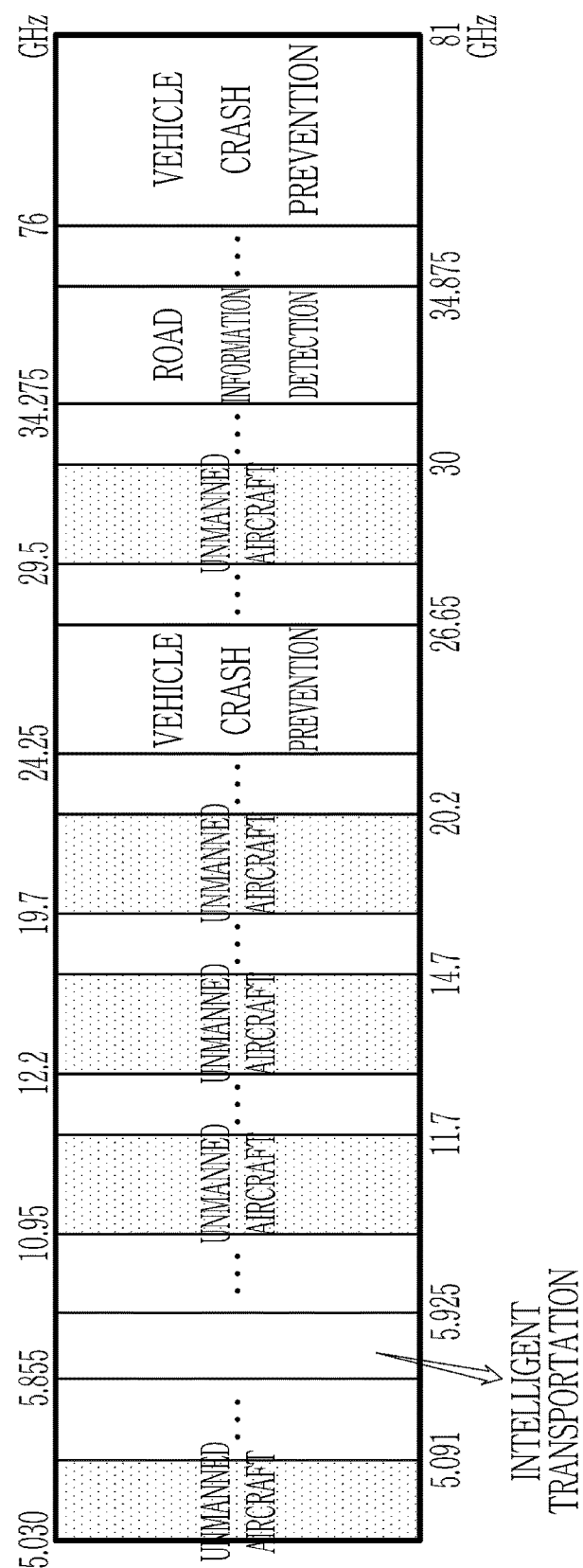
FIG. 4 schematically shows a frequency band used in an unmanned aircraft communication system.

FIG. 4 schematically shows a frequency band used in an unmanned aircraft communication system.

Referring to FIG. 4, the frequency band used in the unmanned aircraft communication system is divided into five frequency bands (total 4.3 GHz) from 5 GHz to 30 GHz. In an environment in which a plurality of frequency bands are dispersed as described above, when the optical coupling technique described with reference to FIG. 1 is used, the dispersed plurality of frequency bands may be used as one frequency band. Also, when the frequency hopping technique described with reference to FIG. 2 is used, the security of the communication system may be enhanced by actively using the dispersed plurality of frequency bands.

The exemplary embodiments of the present invention are not implemented through the above-described devices and/or methods, but may be implemented through a program for realizing functions corresponding to the configuration of the exemplary embodiment of the present invention or a recording medium on which the program is recorded, and such an embodiment may be readily implemented by those skilled in the art from the description of the exemplary embodiment described above.

While the present invention has been particularly shown and described with reference to exemplary embodiments thereof, the scope of rights of the present invention is not limited thereto and various modifications and improvements of those skilled in the art using the basic concept of the present invention as defined in the following claims are also within the scope of the present invention.

What is claimed is:

1. A transmitter comprising:
   an optical comb generator configured to generate an optical comb signal including a plurality of first wavelength signals having different wavelengths;
   a pulse shaper configured to attenuate remaining wavelength signals excluding a plurality of second wavelength signals among the plurality of first wavelength signals;
   an optical-electronic converter configured to generate a carrier frequency signal from the plurality of second wavelength signals outputted from the pulse shaper;
   a transmitter configured to transmit a signal to a receiver using the carrier frequency signal;
   a memory storing a plurality of security codes and a carrier frequency corresponding to each of the plurality of security codes; and
   a controller configured to sequentially select at least one of the plurality of security codes according to a frequency hopping pattern and control the pulse shaper according to a carrier frequency corresponding to the selected at least one security code.

2. The transmitter of claim 1,
   wherein the controller is configured to control the plurality of second wavelength signals such that a carrier frequency of the carrier frequency signal varies in correspondence to the carrier frequency corresponding to the selected at least one security code.

3. The transmitter of claim 1, further comprising:
   a transceiver configured to transmit the selected at least one security code to the receiver.

4. The transmitter of claim 1,
   wherein the optical-electronic converter is configured to generate the carrier frequency signal by beating the plurality of second wavelength signals with each other.

5. The transmitter of claim 1
   wherein the carrier frequency of the carrier frequency signal is determined by a frequency difference between the plurality of second wavelength signals, and
   wherein the controller is configured to control the number of the plurality of second wavelength signals output from the pulse shaper so that a signal output from the optical-electronic converter includes a multi-carrier frequency signal.

6. The transmitter of claim 3,
   wherein a frequency signal used to transmit the at least one security code in the transceiver is a signal of a low frequency band relative to the at least one carrier frequency signal.

7. The transmitter of claim 6,
   wherein the plurality of security codes and the carrier frequency corresponding to each of the plurality of security codes are shared with the receiver.

8. A receiver comprising:
   an optical comb generator configured to generate an optical comb signal including a plurality of first wavelength signals having different wavelengths;

a pulse shaper configured to attenuate remaining wavelength signals excluding a plurality of second wavelength signals among the plurality of first wavelength signals;

an optical-electronic converter configured to generate a carrier frequency signal from the plurality of second wavelength signals outputted from the pulse shaper;

a receiver configured to receive a signal from a transmitter using the carrier frequency signal;

a memory storing a plurality of security codes and a carrier frequency corresponding to each of the plurality of security codes;

a transceiver configured to receive at least one security code that varies according to a frequency hopping pattern from the transmitter; and a controller configured to obtain a carrier frequency corresponding to the received at least one security code from the memory and control the pulse shaper according to the carrier frequency corresponding to the at least one security code.

9. The receiver of claim 8,
wherein a frequency signal used to receive the at least one security code in the transceiver is a signal of a low frequency band relative to the at least one carrier frequency signal.

10. The receiver of claim 8,
wherein the plurality of security codes and the carrier frequency corresponding to each of the plurality of security codes are shared with the transmitter.

11. The receiver of claim 8,
wherein the optical-electronic converter is configured to generate the carrier frequency signal by beating the plurality of second wavelength signals with each other.

12. The receiver of claim 11,
wherein the frequency of the carrier frequency signal is determined by a frequency difference between the plurality of second wavelength signals, and wherein the controller is configured to control the number of the plurality of second wavelength signals output from the pulse shaper so that a signal output from the optical-electronic converter includes a multi-carrier frequency signal.

13. A radio frequency signal generation device comprising:

an optical comb generator configured to generate an optical comb signal including a plurality of first wavelength signals having different wavelengths;

a pulse shaper configured to attenuate remaining wavelength signals excluding a plurality of second wavelength signals among the plurality of first wavelength signals;

an optical-electronic converter configured to generate a radio frequency signal including a carrier frequency signal from the plurality of second wavelength signals outputted from the pulse shaper; and a pulse shaping controller configured to control the pulse shaper such that a carrier frequency of the carrier frequency signal varies according to a frequency hopping pattern.

14. The radio frequency signal generation device of claim 13,
wherein the pulse shaping controller is configured to control the number of the plurality of second wavelength signals so that the radio frequency signal output from the optical-electronic converter includes a multi-carrier frequency signal.

* * * * *